United States Patent [19]

Zimmer

[11] Patent Number: 5,022,581
[45] Date of Patent: Jun. 11, 1991

[54] WELDING PARTS HAVING DIFFERENT THERMAL EXPANSIONS

[75] Inventor: Gero Zimmer, Rolling Hills Etd., Calif.

[73] Assignee: Productech Inc., Rolling Hills Esatades, Calif.

[21] Appl. No.: 518,930

[22] Filed: May 4, 1990

[30] Foreign Application Priority Data

May 5, 1989 [DE] Fed. Rep. of Germany ....... 3914862

[51] Int. Cl.$^5$ .............................................. B23K 33/00
[52] U.S. Cl. .................................... 228/164; 228/174; 219/105
[58] Field of Search ...................... 228/141.1, 164, 170, 228/174, 203, 5.7; 219/105

[56] References Cited

U.S. PATENT DOCUMENTS

| 2,007,308 | 7/1935 | Sambraus | 228/164 |
| 2,943,388 | 7/1960 | Rote | 228/174 |
| 3,003,601 | 10/1961 | Oh | 228/164 |
| 3,169,309 | 2/1965 | Groman | 228/164 |
| 3,962,002 | 6/1976 | Finkbeiner et al. | 228/164 |
| 4,046,305 | 9/1977 | Brown et al. | 228/174 |
| 4,409,278 | 10/1983 | Jochym | 228/174 |

FOREIGN PATENT DOCUMENTS

| 117899 | 9/1981 | Japan | 228/165 |
| 177897 | 11/1982 | Japan | 228/164 |
| 282792 | 12/1987 | Japan | 228/174 |

Primary Examiner—Sam Heinrich
Attorney, Agent, or Firm—Notaro & Michalos

[57] ABSTRACT

The thermal expansion of parts to be welded to each other is reduced in that one or more of the parts are modified to include expansion slots in the welding area. This limits thermal expansion to the remaining small areas only which are allowed to expand within the slots. Total expansion of such welded parts is thus reduced after solidfication. In most applications, such slots do not effect the total design of the welded parts. If required, such slots can be sealed after welding.

13 Claims, 2 Drawing Sheets

WELDING PARTS HAVING DIFFERENT THERMAL EXPANSION

FIELD AND BACKGROUND OF THE INVENTION

The present invention refers in particular to joining thin parts together, such as sheets of metal etc., where the thermal expansion of the sheets along their large dimensions is large compared to the thickness of the sheets.

This description refers basically to joining such parts together by welding, brazing or soldering at their thinnest or smallest dimensions in any direction.

During the heating of such parts at their joining areas during a welding process, so as to fuse one or more of the parts, the heated surrounding areas expands due to their thermal properties. The amount of expansion can be different, due to the use of different materials for the parts. This causes the basic parts to deform and cause high mechanical force in the materials.

This is in particular the case if different materials are joined together. Due to the cool down conditions, the fused material(s) solidifies within the joint area, therefor freezing such thermally created stresses in the remaining solid parts, creating a final cooled part having a different shape than it was before welding. It should be noted, that extremely high mechanical tensions can be frozen into such welded products.

Very little is published about handling and reducing thermal expansion during the fusion welding process. Due to the freezing of the thermal expansion during solidification, the expansion problem occurs with similar and in particular dissimilar materials, such as during welding steel alloys to copper. Further, extremely thin parts are affected as well, in particular such parts have dissimilar dimensions.

An applied beam of energy for welding also has a positioning tolerance during the welding process and therefor heats the items with tolerance. This results in tolerances of thermal expansion as well. This disadvantage starts during the first moment of applying thermal energy and is also applied to the mechanical fixture holding these parts.

SUMMARY OF THE INVENTION

An object of the present invention is to prevent or reduce such mechanical tensions in parts after welding them together.

The procedure of the invention involves welding parts together by fusing, such as performed by local heating using an electrical current as the required thermal source, or a laser or a focused electron beam. Such joining process can also be performed using a third material, a process which is usually called brazing or soldering, depending on the applied temperature.

According to the invention, thermally created mechanical expansion is divided into several well defined smaller sections, which basically do not affect each other. Based on the invention, expansion slots are cut into one or more parts to be welded together in an almost crosswise direction compared to the welding line, therefor reducing the occurring mechanical expansion only to the created sections limited by the slots. Mechanically expanded material moves into these slots and will there be frozen during the solidification of the materials.

Separating the mechanical expansion into smaller sections with expansion slots drastically reduces the applied mechanical stress to the items which are welded together and therefor allows the items to maintain their shape with much smaller tolerances.

The expansion slots do not greatly effect the basic design of the final welded products. A typical example is welding a thermally high resistance material (iron alloy) to a copper connector to form heating elements. In such applications, the required expansion slots can be placed in mechanically non-critical areas. The mechanical design can allow the applied flow of electrical current to do the heating job and the final application is not effected by such slots.

In case these slots are not wanted after the welding operation, they can simply be closed after welding. This can be done using the same material. Because the slots are extremely small, closing the slots is easy.

It should be mentioned, however, that any dissimilar materials with different thermal expansions always created mechanical stress in the final product, at different temperatures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
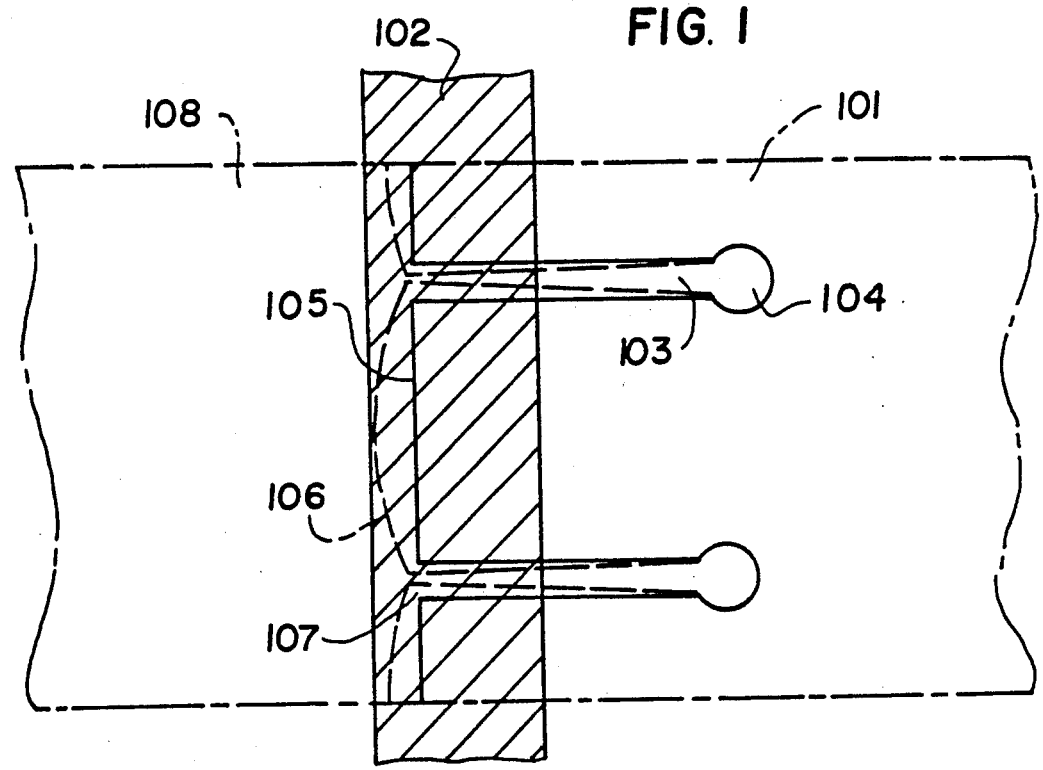
FIG. 1 is a top plan schematic view of two parts to be welded to each other at a joining line or area.

FIG. 1 shows the basic configuration for the joining procedure of the invention. 101 is one item or part, such as a sheet of metal, cross hatched area 102 is the heated area in which the materials melt, such as the area created by an external thermal source. Part 101 is to be welded to part 108. Expansion slots 103 are configured at about a 90 degree orientation compared to the expanding welding/joining line or area 102. Additional mechanical modifications 104 (enlargement or circular bores at the end of each slot) are provided to accept high mechanical stress more easily.

Applying thermal energy to the area 105 of part 101 remaining between the slots in the shown width of weld area or line 102, creates a typical thermal expansion as shown by the dashed expansion line 106. This heated material, however, can also expand in accordance to line 107 in both directions. Limitations for a specified material and its dimensions are based on calculated thermal expansion in accordance with the defined slots.

Such calculations can be made well prior to the welding process.

Figure 2:
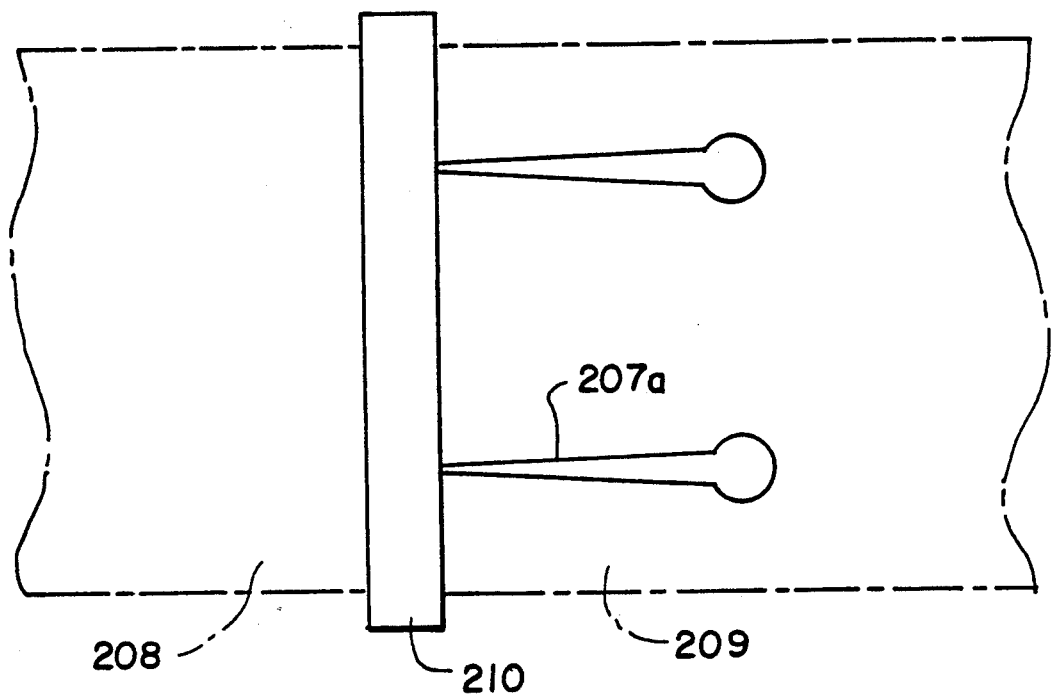
FIG. 2 is a view similar to FIG. 1 showing two parts after they have been connected by welding.

FIG. 2 shows the basic configuration of a final welding line 210. Both parts 208 and 209 are joined by the welding line 210. Because of freezing the expanded material during solidification into its thermally expanded shape, the machined originally parallel slot walls are not parallel anymore and keep the frozen shape as shown at 207a.

Figure 3:
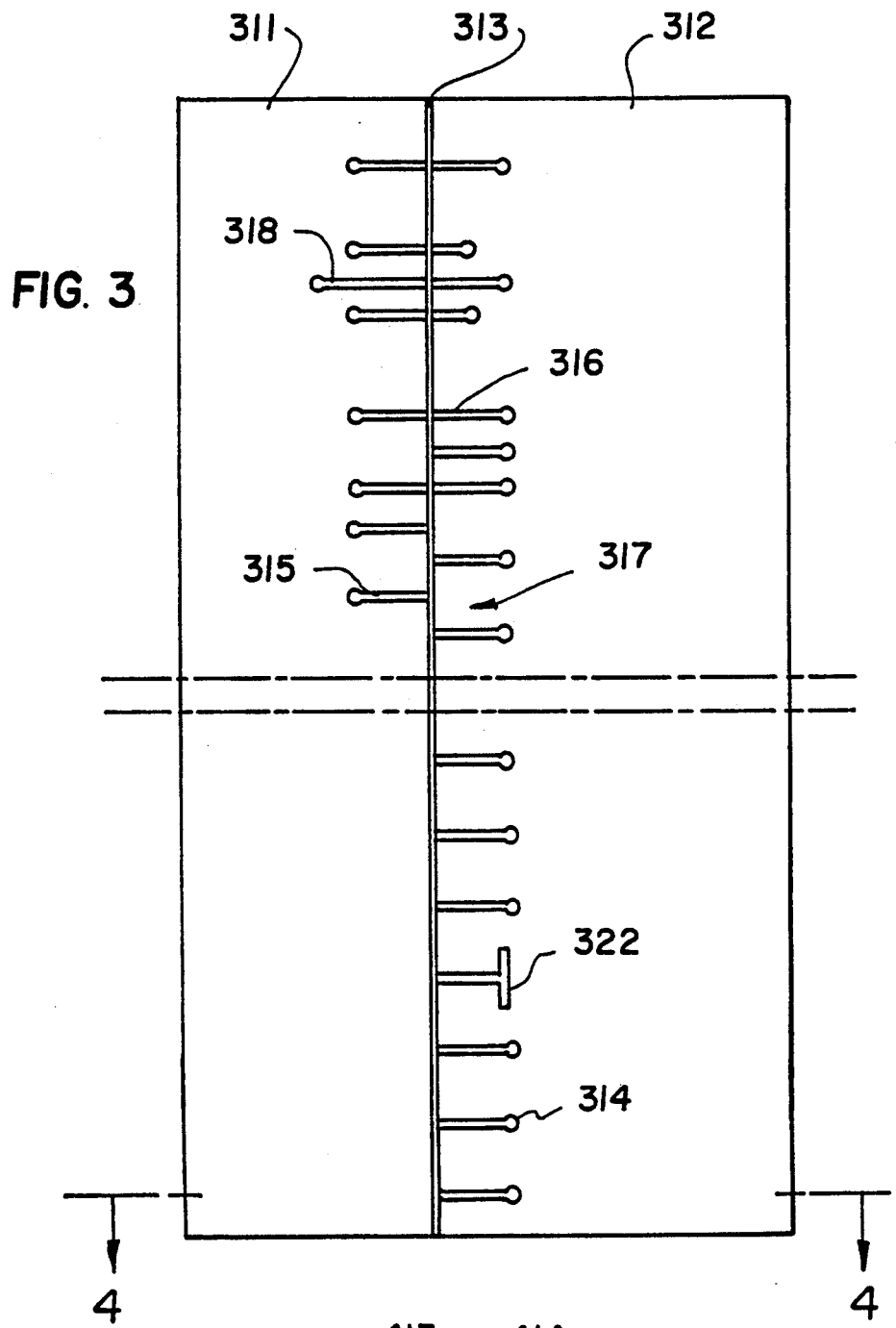
FIG. 3 is a top plan view of two parts which have been welded to each other and which contain a variety of expansion slots in accordance with the present invention.

FIG. 3 is a typical configuration which could be shown in a scale of 1:1. Both parts 311 and 312 having joining edges which are joined at the welding line 313. The slots 314 are machined into these parts at their joining edges, prior to the welding process. Depending on the materials of the parts used and in particular of the material combinations of both parts, the expansion slots of the invention can be made in the other parts 311 as well. This results in a further reduction of the mechanical tensions in these parts. Each slot has an outer end at the joining edge and an enlarged inner end spaced from the joining edge (see 104 in FIG. 1, for example).

The expansion slots can be made in direct opposition 316 or offset as shown at 317. This allows for the matching of the various material requirements.

These expansions slots may differ in their length 318 or shape 322, for further limitations of thermal expansion.

Figure 4:
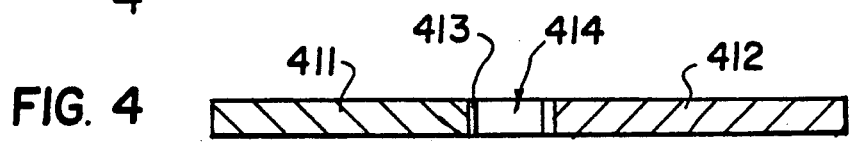
FIG. 4 is a sectional view taken in along line 4—4 of FIG. 3.

FIG. 4 shows a cross section of FIG. 3 at line 4—4. The shape of slot 414 can have a different configuration, such as having an additional crossing slot as in slot 322. This results in further reduction of thermal expansions. The direction of this additional slot can be different from that of the mainslot, such as almost parallel to the welding line 313.

Figure 5:
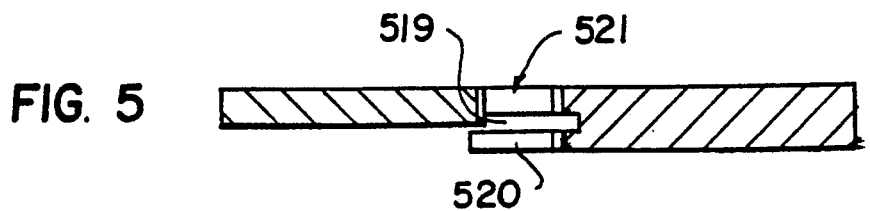
FIG. 5 is a view similar to FIG. 4 showing a different embodiment of the invention where one part to be welded is thicker than the other.

FIG. 5 shows an additional option which can be used when the two parts have different thicknesses and material properties. An additional slot 519 is created, basically within the area of thermal expansion and to define an additional free ended bar 520 at the joining edge. The thickness of the parts can be configured to be different in the welding area in order to match the different thermal requirements of these parts.

While specific embodiments of the invention have been shown and described in detail to illustrate the application of the principles of the invention, it will be understood that the invention may be embodied otherwise without departing from such principles.

What is claimed is:

1. A method of joining one part to another at a joining line extending along joining edges of the parts to be joined, comprising:
    forming a plurality of mechanical slots in the joining edge of at least one part, each slot extending at substantially 90 degrees to the joining line from an outer end of the slot at the joining edge, to an inner end of the slot spaced from the joining edge;
    heating the parts adjacent the joining edges thereof to initiate joining of the joining edges; and
    allowing the joining edges to cool to form the joining line, expanded material of at least one part extending into the slots and the joining line extending across at least some of the slots at the outer ends thereof.

2. A method according to claim 1, including closing each of the slots after the joining line is formed.

3. A method according to claim 1, including forming mechanical slots in the joining edge of each of the parts.

4. A method according to claim 3, wherein the slots of one part are offset with respect to the slots of the other part.

5. A method according to claim 3, wherein the slots of one part are aligned with the slots of the other part.

6. A method according to claim 1, wherein the slots have different lengths.

7. A method according to claim 1, wherein the slots have different shapes.

8. A method according to claim 1, wherein the parts have different thermal properties, the method including selecting the mechanical slots to be large enough to receive expanding material of the one part into the slot.

9. A method according to claim 1, wherein at least one of the mechanical slots defines a free ended a bar at the joining edge of the at least one part.

10. A method according to claim 1, including forming each mechanical slot to have an enlarged inner end.

11. A method according to claim 10, wherein the enlarged end is circular.

12. A method according to claim 10, wherein the enlarged end comprises a crossing slot.

13. A method according to claim 12, wherein the crossing slot extends substantially parallel to the joining line.

* * * * *